No. 698,067. Patented Apr. 22, 1902.
F. H. SMITH.
BASKET PACKER.
(Application filed Nov. 18, 1901.)
(No Model.) 2 Sheets—Sheet I.
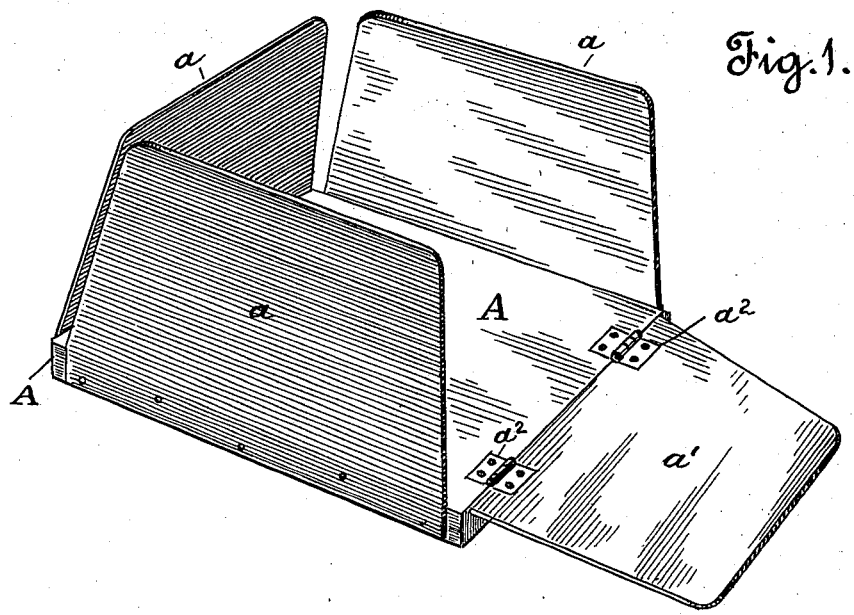
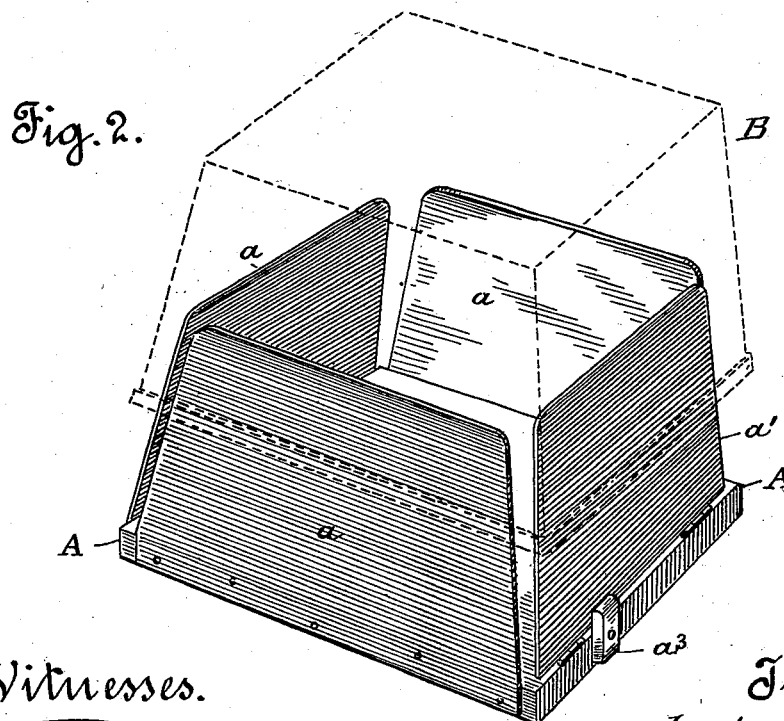
Witnesses.
Inventor.
Frederick H. Smith
by Wm. F. Booth
his Attorney.

No. 698,067. Patented Apr. 22, 1902.
F. H. SMITH.
BASKET PACKER.
(Application filed Nov. 18, 1901.)
(No Model.) 2 Sheets—Sheet 2.
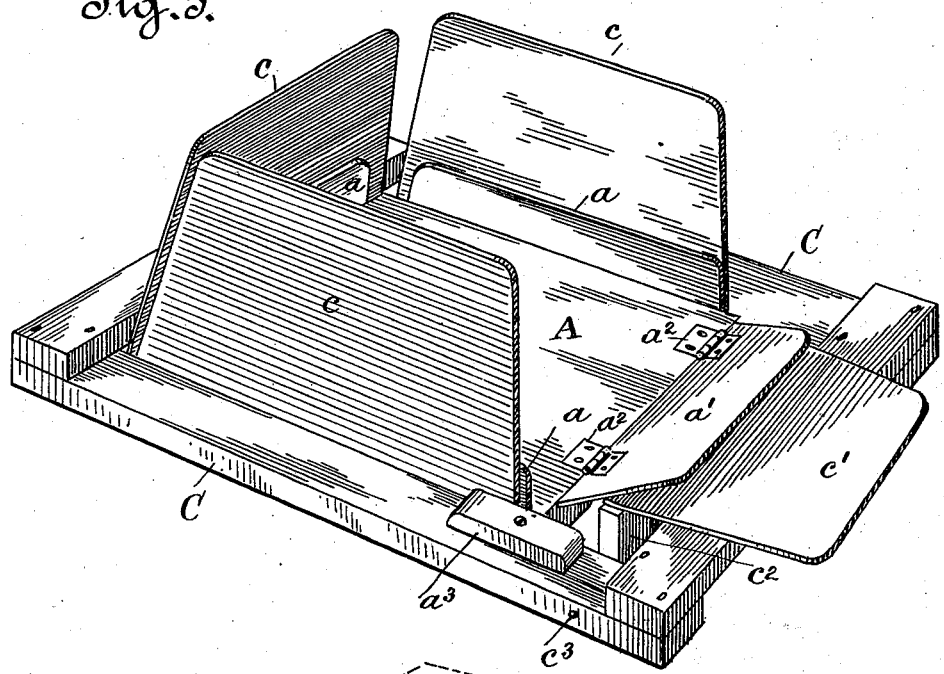
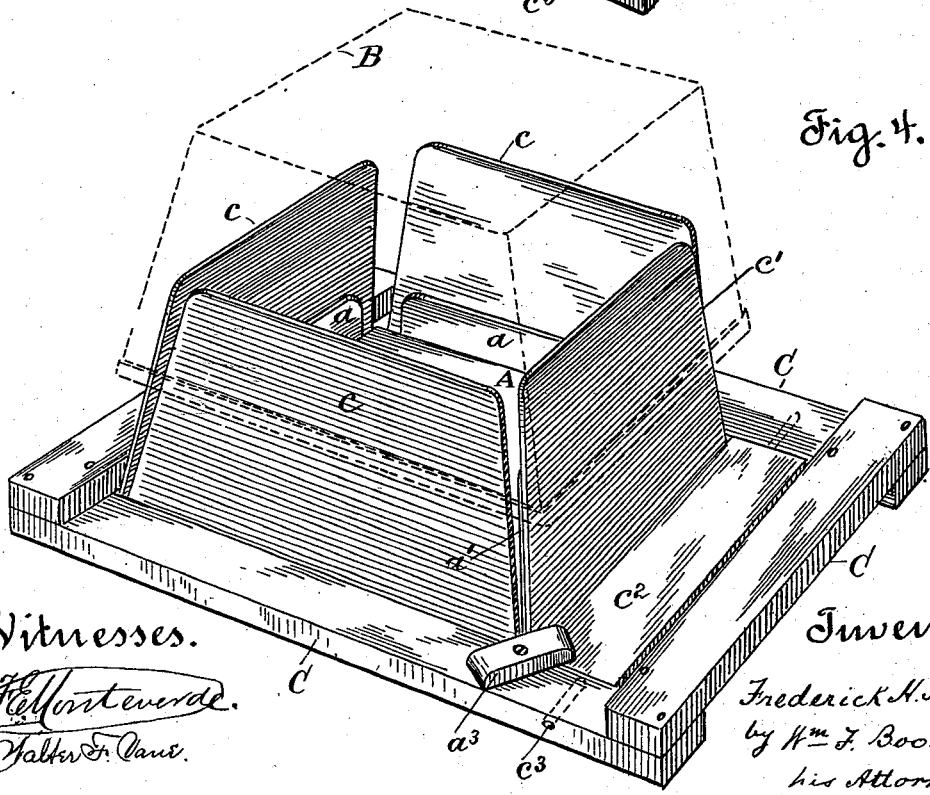
Witnesses.
F. E. Monteverde.
Walter F. Cane.
Inventor.
Frederick H. Smith
by Wm. F. Booth
his Attorney.

UNITED STATES PATENT OFFICE.

FREDERICK H. SMITH, OF WRIGHTS, CALIFORNIA.

BASKET-PACKER.

SPECIFICATION forming part of Letters Patent No. 698,067, dated April 22, 1902.

Application filed November 18, 1901. Serial No. 82,637. (No model.)

*To all whom it may concern:*

Be it known that I, FREDERICK H. SMITH, a citizen of the United States, residing at Wrights, Santa Clara county, State of California, have invented certain new and useful Improvements in Basket-Packers; and I do hereby declare the following to be a full, clear, and exact description of the same.

My invention relates to the class of devices for facilitating the packing of fruit in baskets and other receptacles.

It is the practice in packing many kinds of fruit to lay the fruit carefully in the bottom of the box in order to form an even layer and then after the box is filled to nail the lid on permanently, after which the box is turned over to let the lid form the bottom, and what was at first the bottom forms the lid, which upon being removed exposes the layer of fruit which was initially the bottom layer as a well-appearing uniform top layer. This plan is, however, not available for baskets, which are usually made with integral bottoms, and in order to carry out the same idea of presenting a well-appearing uniform top layer in the top of the basket it is customary to use a separate packing-tray, in which the fruit is first packed, the bottom layer being uniform, and over this tray to telescope the basket, and then by reversing the two and removing the packing-tray to leave the fruit in the basket with the carefully-packed bottom layer on top. This tray is termed a "basket-packer," and though it may be made single it is usually made of two separable parts in order to more readily remove it from the basket when inverted. This packer consists, essentially, of a bottom with circumscribing flanges. Now in packing the fruit into this considerable care and time must be used in filling the bottom layer snugly into the space between the flanges. With larger fruit or fruit in bunches, especially grapes, for the packing of which my invention is particularly intended, this care and loss of time are especially noticeable, for it is difficult to get the final bunches to fit accurately and neatly in the remaining space.

The object of my invention is to remedy this difficulty by providing such a construction of packer as will enable the operator to rapidly and accurately fill the grapes neatly into their allotted space; and to this end my invention consists in making one of the circumscribing flanges of the packer or one flange of each portion of a two-part packer adjustable in such a manner that it or they can be manipulated to leave the space in the packer open on one side during the packing of the grapes into it, said flange or flanges being then adjusted to first position and held in place, thus completing the packer ready to invert the basket over it.

Referring to the accompanying drawings, Figure 1 is a view of a single-framed packer, showing the adjustable flange down. Fig. 2 is a view of same, showing the flange up and the basket about to be inverted over it. Fig. 3 is a view of a two-part packer, showing its adjustable flanges down. Fig. 4 is a similar view showing the flanges up and the basket about to be inverted over said packer.

In Figs. 1 and 2 I show, first, a single-framed packer. This consists of a bottom A, having the circumscribing flanges $a$. Three of these are fixed, but the fourth (designated by $a'$) is made adjustable in any suitable manner, as by hinging it at $a^2$, so that it can be turned down outwardly, as shown in Fig. 1. When so turned the grapes are to be packed upon the bottom, working from the closed walls toward the open side, and the last bunches put in on the open side can be rapidly placed and without such careful selection as would be required if the entire bottom were walled in. By allowing these last bunches to overlap the circumscribed space on the open side they will be pressed in firmly to form a complete neat layer, when the hinged flange is turned up again, as shown in Fig. 2. When so turned up said flange is held in place by any suitable means, as by the button $a^3$. In Fig. 2 I show the basket B in dotted lines about to be inverted and telescoped down upon the packer. When now the parts are reversed and the packer is lifted off, the grapes are left in the basket neatly packed; but in practice, in order to more easily remove the packer when inverted, it is usually made of two parts, as I show in Figs. 3 and 4. In this form the bottom A has comparatively low fixed flanges $a$, one, $a'$, being adjustable, as by hinging, as shown at $a^2$. Then loosely fitting around this bottom is a separate frame C, having taller flanges c, one of which, c', is adjustable, as by hinging, to enable it to lie down. The hinging in this case is by means of a base-bar $c^2$, pivoted in the line of its outer edge at $c^3$ in the frame-bars. This construction enables both flanges a' and c' to lie down outwardly together and without interference, as shown in Fig. 3. When the packer is filled with the grapes, both flanges are turned up again and lie close together and are secured by the button $a^3$, as I show in Fig. 4. In this figure I show the basket B in dotted lines about to be inverted over the packer. Then when the parts are reversed the low-flanged bottom A readily slips away, leaving the high-flanged frame to be slipped off with equal facility.

Having thus described my invention, what I claim as new, and desire to secure by Letters Patent, is—

1. A basket-packer, comprising a bottom having circumscribing flanges fixed in part, the remaining part being adjustable, to expose the bottom from that part only.

2. A basket-packer, comprising a bottom having circumscribing flanges fixed in part, the remaining part being adjustable, to expose the bottom from that part only, and means for locking said adjustable part in an upright position.

3. A basket-packer comprising a bottom having circumscribing low flanges, the flange on one side being adjustable to expose the bottom from that side, and a separate frame about said bottom having circumscribing taller flanges, one of which, corresponding to the adjustable flange of the bottom, is also adjustable to expose the bottom from the same side.

4. A basket-packer comprising a bottom having circumscribing low flanges, the flange on one side being adjustable to expose the bottom from that side, a separate frame about said bottom having circumscribing taller flanges, one of which, corresponding to the adjustable flange of the bottom, is also adjustable to expose the bottom from the same side, and means for locking both adjustable flanges in an upright position.

In witness whereof I have hereunto set my hand.

FREDERICK H. SMITH.

Witnesses:
 JAMES MENEY,
 G. C. LAURENCE,
 R. R. BELL.